Sept. 3, 1957　　　　　　　J. W. LESS　　　　　2,804,627
PRE-TIED NECKTIES AND METHODS FOR MAKING THE SAME
Original Filed Aug. 29, 1952　　　　　　　4 Sheets-Sheet 1

INVENTOR
JOSEPH W. LESS,
BY *Stone, Boyden & Mack*
ATTORNEYS

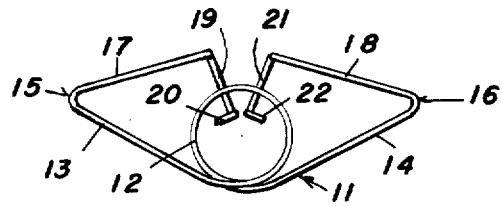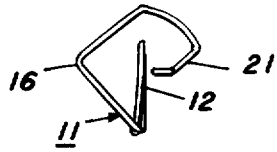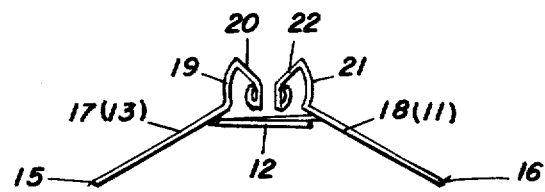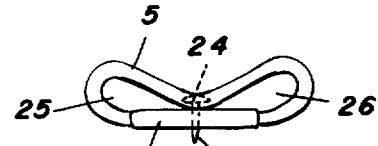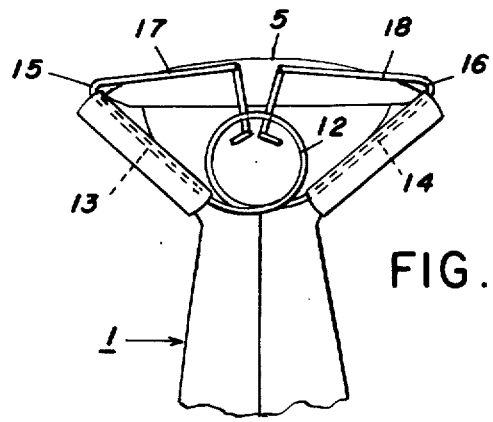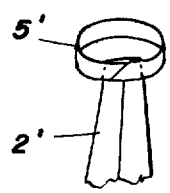

Sept. 3, 1957  J. W. LESS  2,804,627
PRE-TIED NECKTIES AND METHODS FOR MAKING THE SAME
Original Filed Aug. 29, 1952  4 Sheets-Sheet 3

INVENTOR
JOSEPH W. LESS,
BY Stone, Boyden & Mack
ATTORNEYS

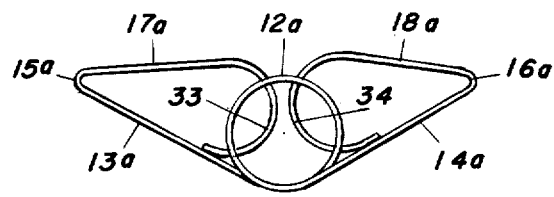
FIG. 13
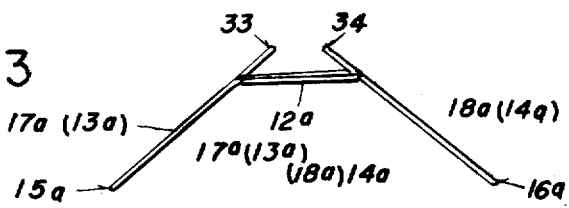
FIG. 14
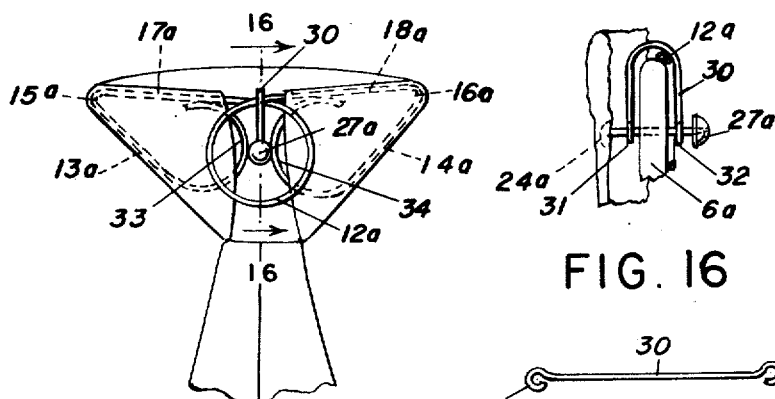
FIG. 15
FIG. 16
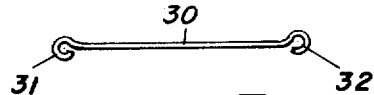
FIG. 17
INVENTOR
JOSEPH W. LESS,

United States Patent Office 2,804,627
Patented Sept. 3, 1957

2,804,627

PRE-TIED NECKTIES AND METHODS FOR MAKING THE SAME

Joseph W. Less, Clinton, Iowa, assignor to One-In-Hand Tie Company, Clinton, Iowa Application June 13, 1956, Serial No. 592,708

18 Claims. (Cl. 2—150)

This invention relates to neckties and more particularly to an improved pre-tied tie and method for making it.

While many efforts have been made in the past to provide a satisfactory four-in-hand tie so made up that the wearer either need not tie the knot at all or need not form the entire knot, the devices so provided have had numerous disadvantages and have had only limited commercial success. Usually, such ties have not accurately simulated the Windsor knot, and have often had a more or less unconventional "made up" appearance. Frequently, prior art pre-tied ties have been difficult to attach and uncomfortable when worn. Finally, they have been unduly expensive, so that they have offered little advantage over the conventional.

By my invention, I attain the dual advantage of accurate simulation of the Windsor knot, and extremely low material and labor costs. To attain these results, I employ a novel method for making up the tie, using only a limited amount of fabric and a simple knot shaping element. I eliminate the neckband of the tie, which is useless and uncomfortable in warm weather. Also, I may eliminate the tail of the tie, and I provide a positive means of attachment which is effective and provides no discomfort to the wearer.

In order that the invention may be understood in detail, reference is had to the accompanying drawings, which form a part of this specification, and wherein.

Figure 2:
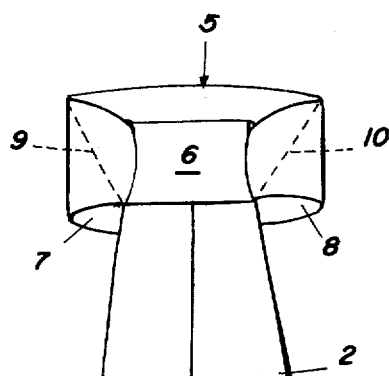
Fig. 2 is a rear elevational view of the basic knot structure so formed.
Figure 4:
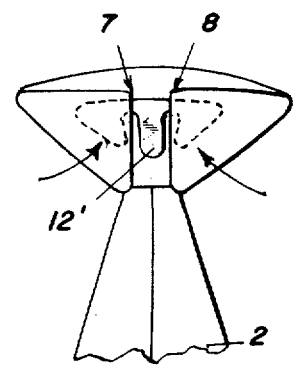
Figure 3:
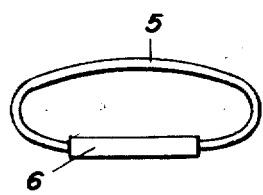
Figure 10:
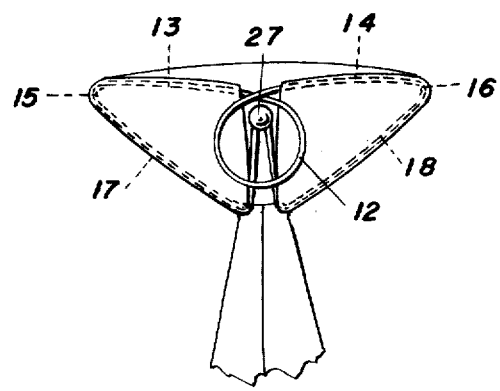
Figure 11:
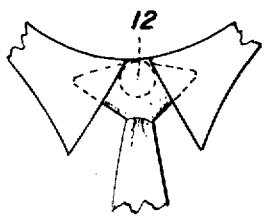
Figure 12:
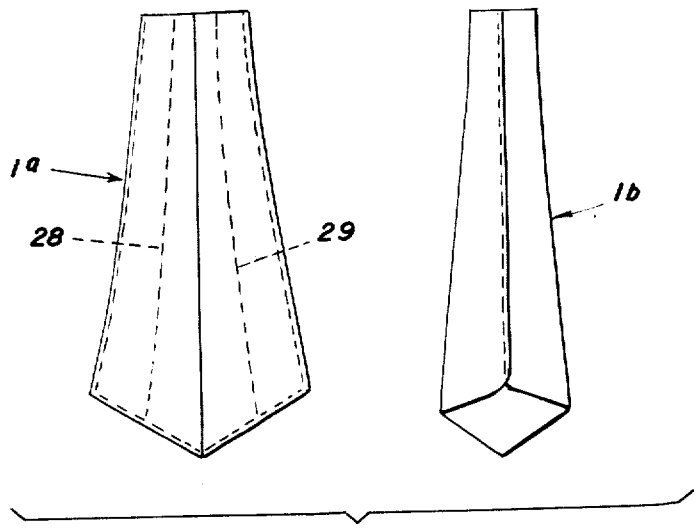

Fig. 2ª is a perspective view of a similar basic knot structure formed in another manner in accordance with my invention;

Fig. 3 is a top view of the structure of Fig. 2;

Fig. 4 is a rear elevational view of a completed knot formed according to the invention from the basic structure of either Fig. 2 or Fig. 2ª;

Fig. 5 is a view similar to Fig. 3 but showing a fastener inserted in the basic knot structure to prevent loosening;

Figs. 6–8 are respectively an elevational view, an end view and a top view of one type of knot shaping form employed in the invention;

Fig. 9 is a rear elevational view of the preliminary knot structure of Figs. 2–3 with the knot shaping form of Figs. 6–8 inserted therein preparatory to completing the knot;

Fig. 10 is a rear elevational view of the completed knot;

Fig. 11 is a view of a completed tie in place on a shirt collar, illustrating the manner of attachment;

Fig. 12 is a diagram illustrating how a tie blank may be prepared for use in the invention without sewing into tubular form;

Figs. 13 and 14 are respectively an elevational view and a top view of a second type of knot shaping form employed in the invention;

Fig. 15 is a rear elevational view of a completed knot including the form of Figs. 13 and 14;

Fig. 16 is a fragmentary sectional view taken on the line 16—16, Fig. 15; and

Fig. 17 is a plan view of a retaining member employed in the embodiment shown in Fig. 15.

In accordance with one form of my method, I first provide a preliminary tie structure from suitable neckwear material, comprising a main tie body joined at the top by a laterally extending closed knot forming loop. I wrap a portion of the tie body about the loop, at its point of joinder with the body, to provide a roll consisting of at least a portion of a turn and having greater bulk than the tie body, the roll being so formed that the tie body depends therefrom through the interior of the loop, with the major extent of the loop positioned forwardly of the front face of the tie body. I then flatten the loop against the roll, and fold the ends of the flattened loop upwardly and inwardly behind the roll, so that each end forms a generally triangular fold, and these folds are then secured in place behind the roll to hold the knot in the typical tapered form of a four-in-hand tie knot.

Figure 1:
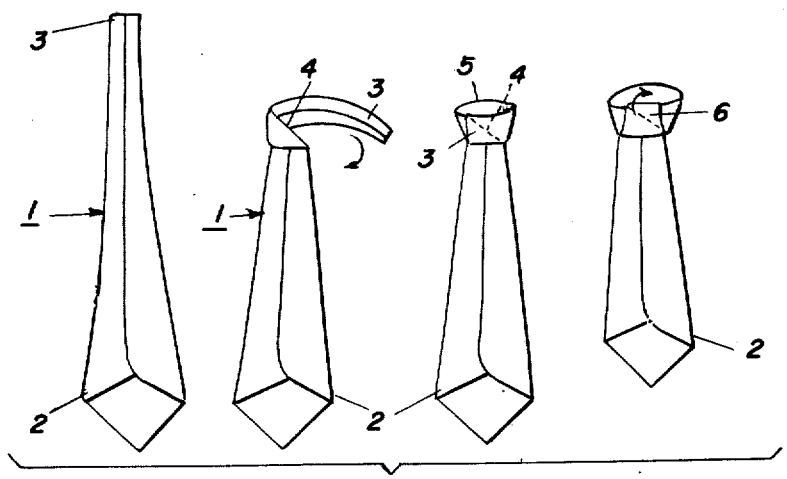
Fig. 1 is a diagram illustrating a preferred manner in which a tie blank is folded to produce a basic or preliminary necktie knot structure in accordance with my invention.

As seen in Fig. 1, I may start with a tie blank 1 of conventional tubular construction tapered from the larger bottom end 2 to a smaller top end portion 3. The blank 1 may, for example, correspond to one half of a conventional four-in-hand tie. Somewhat nearer the top end than the bottom, depending upon the size of the knot desired, I fold the blank 1 along a transverse angularly disposed line 4, passing the top end 3 behind the main body of the blank to start the laterally extending knot forming loop 5. The end 3 is brought around to overlap the fold 4, so closing the loop. While the fold 4 and end 3 are temporarily held in place, the main body 2 of the tie is passed upwardly on the outside of the loop 5 and then downwardly through the loop, so that the tie body encircles or is wrapped around a portion of the loop, where the loop joins the tie body to provide a roll 6 presenting somewhat greater bulk than the balance of the loop.

As seen in Figs. 2 and 3, the loop 5, when formed in the manner just described, extends forwardly of the front face of the tie body 1, the latter actually depending through the loop from the roll 6. To complete the knot, I flatten the loop against the roll 6 and fold the ends 7 and 8, Fig. 2, of the loop upwardly and inwardly, roughly about the lines 9 and 10, respectively, to give the final knot shape seen in Fig. 4, the loop thus being drawn about the roll 6 so that the front portion of the loop, instead of being slack as seen in Figs. 2 and 3, is tensioned. As will be hereinafter explained, I prefer to make the folds about the lines 9 and 10 by insertion in the preliminary knot structure of the knot shaping form 11 shown in Figs. 6–8.

As seen in Fig. 2ª, I may make the preliminary tie structure by securing a tie body 2' to a closed loop 5', the loop 5' being formed by joining the ends of a suitable strip of fabric together and then sewing the joined ends to the rear face of the body 2'. The tie body may then be wrapped about the loop 5' in the manner previously described herein to provide a relatively bulky roll.

In either case, the end portions of the loop are folded upon themselves to form generally triangular folds positioned behind the roll and secured in such position in any suitable manner to complete the knot. The folded portions may be sewn to the roll 6, or they may be held in place by a suitable mechanical device such as that shown in Figs. 6–8. It will be noted that the completed tie includes neither a tail nor a neckband. To secure the tie in wearing position, I provide a small hook at the back of the knot designed to engage over the upper edge of the neckband of a shirt. While, as will be explained, such hook is preferably provided as part of shaping form for the knot, it may be of any other suitable form. For example, in Fig. 4, I have illustrated a simple sheet metal hook 12' which may, if desired, be fabric covered.

By comparing Figs. 2 and 4, it will be noted that the top of the tie body 2 is compressed laterally, when the ends of the loop are folded over to complete the knot, much in the same manner as the corresponding portion of a conventional four-in-hand tie is compressed by the knot. It will be understood in this connection that the ends of the roll 6, or at least the lower corners thereof, may be compressed during the folding of the ends of the loop 5, which is of course flattened against the roll during folding. Or, depending upon the looseness and flatness of the roll 6, the lower corner of the roll may actually be folded along with the ends 7 and 8 of the loop.

The knot shaping form 11, Figs. 6–8, is fabricated from spring wire and comprises as a base a single turn torsion spring 12 having its ends extended oppositely and laterally to form the arms 13 and 14, respectively. The arms 13 and 14 are provided with return bends 15 and 16, respectively, forming additional arms 17 and 18. The arms 13 and 17 lie substantially in the same plane. Similarly, the arms 14 and 18 lie substantially in the same plane, and the two planes so defined are angularly disposed relative to the plane of the spring 12. The arm 17 terminates in a generally semicircular portion 19 lying substantially at right angles to the plane of the spring 12, as shown in Fig. 8, and terminating in a hooked end 20. Similarly, the arm 18 joins a like portion 21 which ends in a hook 22.

Having formed the basic knot structure illustrated in Fig. 2, I then insert a headed fastener 23, Fig. 5, through the roll 6 with the head 24 of the fastener lying behind one ply of the fabric of the loop 5, so that the basic knot structure is held against loosening, and the loop 5 is more or less flattened against the roll 6. While the loop 5 is so flattened or compressed, there still remain a pair of openings 25 and 26 through the loop, as seen in Fig. 5. The spring wire form 11 is now inserted in the basic knot structure, assuming the position shown in Fig. 9. To accomplish this step, the end 22 of arm 18 is inserted through the opening 26 from bottom to top of the loop, and the end 20 of arm 17 is inserted through the opening 25 from bottom to top of the loop. The form 11 is then worked upwardly until the arms 13 and 14 lie within the loop, and the arms 17 and 18 are free of the loop, as seen in Fig. 9.

It will be noted at this stage that the arms 13 and 14 extend more or less laterally of the tie and upwardly through the interior of the loop 5 but not adjacent the top of the loop. Therefore, the loop is not tensioned to a great degree and the knot structure is still quite slack. To bring the knot to the shape previously discussed with reference to Fig. 4, the entire form 11 is rotated backwardly and upwardly with respect to the tie to assume the final position seen in Fig. 10. Such rotation causes a portion of the fabric of the loop 5 at each end of the roll 6 to be drawn inwardly and upwardly relative to the knot structure, as indicated by the arrows in Fig. 4, so that each of said portions is formed into a generally triangular fold positioned behind the roll 6. The arms 17 and 18, respectively, lie in the troughs of these folds, corresponding to the lines 9 and 10, Fig. 2, and the arms 13 and 14, respectively, which extend through the loop 5, now lie substantially at right angles to the main axis of the tie and extend adjacent the upper edge of the loop, so as to tension the folds.

In order to complete the knot, the hooked ends 20 and 22 are placed over the free end of the pin 23 and a friction type fastener 27 slipped on the pin to retain the ends in place, as illustrated in Fig. 10.

It will b noted from Fig. 10 that the single turn spring 12 lies entirely on the outside of the tie knot at the back thereof, and depends from the top of the knot. This spring, in addition to acting as a base for the forming arms 13 and 14, serves as an attaching device for the completed tie. As seen in Fig. 11, the tie is attached in wearing position simply by slipping the spring 12 over and behind the neckband of the shirt.

As describing my method with reference to Fig. 1, I have referred to the tie body as being of conventional tubular form. Conventional ties are, of course, sewn up the back in addition to being fully hemmed. I have found that, when my method is employed, it is unnecessary to sew the tie body into tubular form. As shown in Fig. 12, a tie blank 1ª, which may either be hemmed or pinked, is longitudinally folded along the lines 28 and 29 to provide a tie body 1ᵇ of the same shape and appearance as that shown in Fig. 1, but without stitching the folded flaps together. The method is then carried out in the manner previously described. The knot structure employed is such that the folds 28 and 29 are maintained in place, so that no sewing other than hemming, if that be employed, need be used.

Where relatively heavy fabrics are used, it may be necessary to employ additional retainer means to prevent the single loop of spring 12 from riding up above the top of the completed knot, and under such circumstances I employ the modification illustrated in Figs. 13–17. In this embodiment, as seen in Figs. 15–16, I employ a wire retaining element 30 having at its ends closed loops 31 and 32. The loops 31 and 32 are both engaged over the shank of fastener 23ª, the loop 31 lying between the roll of 6ª of the knot structure and the head 24ª of the fastener, and the loop 32 lying between the roll 6ª and the friction cap 27ª, so that the spring may not be forced upwardly relative to the roll 6ª. As seen in Fig. 17, the retaining element 30 may be made from a strip of soft wire and easily bent into the position of Figs. 15–16 as the knot structure is assembled.

Use of the retaining element 30 eliminates necessity for the hooked ends 20, 22 employed in the device of Figs. 6–8, and when the retaining element 30 is used, I prefer to employ a knot shaping form of the type shown in Figs. 13–14. This form includes the single turn torsion spring 12ª having its ends extended to form arms 13ª and 14ª. These arms are provided with return bands 15ª, 16ª, and the wire of the form extends back from such bends to provide the arms 17ª and 18ª. The arms 17ª and 18ª are simply re-curved, providing the semi-circular bends 33 and 34, Figs. 13 and 15. As in the embodiment discussed with reference to Figs. 6–8, the arms 13ª and 17ª each lie in the same plane, as do the arms 14ª and 18ª, and the two planes so defined diverge in dihedral angle relation, with the plane of the spring 12ª cutting across the arms as seen in Fig. 14.

I claim:

1. In a method for manufacturing a pre-tied tie, the steps comprising forming a preliminary tie structure including a main tie portion and a closed knot forming loop joined to the top of said body portion and extending laterally thereof, wrapping said main body portion around said loop at the point of joinder between said portion and said loop to form a roll from which said main body portion depends, flattening said loop against said roll, folding the ends of the flattened loop each upon itself upwardly and inwardly in back of said roll in a generally triangular fold, and securing the generally triangular folded portions so formed in place in back of said roll to maintain said loop in the tapered form of a four-in-hand tie knot.

2. In a method for manufacturing a pre-tied tie, the steps comprising forming a preliminary tie structure including a main tie body portion and a closed knot-forming loop joined to the top of said body portion and extending laterally thereof, flattening said loop against said body portion to produce a structure in which the flattened loop extends laterally beyond the edges of the tie body, folding the end portions of the flattened loop each upon itself upwardly and inwardly in back of said body portion in a generally triangular fold such that the ends of the flattened loop extend substantially along the top of the body of the loop at the back thereof, and securing the generally triangular folded portions so formed in such position to maintain said loop in the tapered form of a four-in-hand tie knot.

3. In a method for manufacturing a pre-tied tie, the steps comprising making a tie blank including a main tie body portion and a top end portion; folding said blank upon itself along a transverse angularly disposed fold line with said top end portion extending from said fold line laterally across the back of said blank, forming said top end portion into a loop extending around in front of said blank with the end of said top portion disposed behind said blank at said fold line to close said loop and with said main body portion depending from said loop; passing said body portion back, up and downwardly through said loop to form a roll encircling said end and fold line; flattening said loop against said roll, the length of the flattened loop being material greater than the width of the top end portion of said blank adjacent said loop; folding the ends of the flattened loop each upon itself upwardly and inwardly against the back of said roll in a generally triangular fold, and securing such generally triangular folds in place behind said roll to maintain said loop in the tapered form of a four-in-hand tie knot.

4. In a pre-tied tie, the combination of a fabric main tie body portion, a closed fabric knot-forming loop joining said body portion at the top thereof and extending laterally relative to said tie body portion, and means maintaining a substantially triangular portion of said loop on each side of said body-portion folded upon itself upwardly and inwardly behind said body portion with one side of each substantially triangular portion extending laterally of said body portion substantially at right angles thereto to retain said loop in the tapered form of a four-in-hand tie knot.

5. In a pre-tied tie, the combination of a fabric main tie body portion, a closed fabric knot-forming loop joining said body portion at the top thereof and extending laterally and forwardly thereof, and a knot shaping form operatively associated with said loop and maintaining a substantially triangular portion of said loop on each side of said body portion folded upwardly and inwardly behind said body portion with one side of each such substantially triangular portion extending laterally of said body portion substantially at right angles thereto to retain said loop in the tapered form of a four-in-hand tie knot, said knot shaping form including a base member positioned exteriorly of said loop behind said body portion and a pair of arms each extending from said base member laterally of said body portion substantially at right angles thereto adjacent the top of said loop and through the interior of said loop from bottom to top thereof, said arms each being disposed in contact with the fabric of said loop along a different one of said sides of said substantially triangular portions.

6. A pre-tied tie constructed in accordance with claim 5 and wherein said base member of said knot-shaping form is a single turn spring wire torsion spring and said arms are integral extensions of the ends of said spring.

7. In a pre-tied tie, the combination of a fabric tie body tapering from a relatively larger end to a relatively smaller end, said tie body having an angularly disposed transverse fold relatively nearer said small end than said large end and the portion of said tie body between said fold and said small end extending laterally of the tie in the form of a loop with said small end lying against the back surface of the tie body at said fold to close said loop, said tie body encircling said loop at said fold in the form of a roll and depending from said roll through the interior of said loop, and a form including a base member positioned exteriorly of said loop at said roll and a pair of opposed knot shaping arms each extending from said base member laterally of the tie body and through the interior of said loop from bottom to top thereof maintaining a portion of the fabric of said loop folded upon itself behind said roll in a generally triangular fold, whereby said loop is held tensioned against said roll in the tapered form of a four-in-hand tie knot.

8. A pre-tied tie constructed in accordance with claim 6 and in which said base member comprises a hook-like member engageable over the top of the neckband of a shirt to retain the tie in wearing position.

9. In a pre-tied tie, the combination of a fabric tie body and a spring wire knot shaping form; said tie body tapering from a relatively larger end to a relatively smaller end and having a transverse angular fold relatively nearer said smaller end than said larger end with the portion of said tie body between said fold and said smaller end extending laterally of said tie body in the form of a loop and with said small end lying against the back surface of said tie body and overlapping said fold to form a roll and depending from said roll through the interior of said loop; said knot shaping form comprising a base portion in the form of a single turn torsion spring positioned exteriorly of said loop at said roll, the ends of said torsion spring lying adjacent the top edge of said loop and each extending laterally of said tie body and through the interior of said loop from bottom to top thereof maintaining a portion of the fabric of said loop folded upon itself in a substantially triangular fold to tension said loop against said roll in the form of a four-in-hand tie knot.

10. A basic necktie structure for use in the production of a pre-tied tie by insertion of a knot shaping form therein, comprising a fabric tie body having a bottom end and a top end, said tie body having a transverse angularly disposed fold relatively nearer said top end than said bottom end and the portion of said tie body between said top end and said fold extending laterally of said tie body in the form of a loop with said top end lying against the back surface of said tie body and overlapping said fold to close said loop said tie body encircling said loop at said fold and small end to form a roll, and fastening means securing said roll and top end against loosening.

11. A basic necktie structure constructed in accordance with claim 10 and in which said fastening means comprises a pin extending through said roll radially of said loop and provided with a removable retaining element at its end exterior of said loop.

12. In a pre-tied tie, the combination of a fabric tie body portion; a closed fabric knot forming loop joining the top of said body portion and extending laterally thereof, said body portion encircling a portion of said loop to provide a roll and depending from said roll through the interior of said loop; a pin type fastener extending through said roll substantially radially of said loop and having a portion extending exteriorly of said loop; and a spring wire knot shaping element comprising a single turn torsion spring positioned exteriorly of said loop at said roll and having its ends extended laterally of the tie at the top of said loop, said ends each extending through the interior of said loop from bottom to top thereof maintaining a portion of the fabric of said loop in a substantially triangular fold behind said roll to hold said loop in tapered four-in-hand tie knot form, said ends each having a return bend to provide arms each extending downwardly and toward the center of the tie and lying in the trough of the corresponding one of said folds to tension the same, each of said arms terminating in a catch portion engaged over said fastener.

13. A pre-tied tie constructed in accordance with claim 12 and in which the terminal portions of said arms each include a portion offset from the plane of said torsion spring toward the center of said loop to cause the tie knot to bulge forwardly.

14. A pre-tied tie comprising a fabric tie body and a knot shaping form; said tie body comprising a single piece of neckwear material provided with two spaced longitudinal folds defining the shape of the tie body and such that the edges of said piece underlie said body, said body being provided with an angularly disposed transverse fold spaced from the top end thereof and that portion between said fold and top end extending laterally of said body in the form of a loop with said top end lying against the back surface of said body and overlapping said transverse fold to close said loop, said body encircling said loop at said fold to form a roll and depending from said roll through the interior of said loop; said knot shaping form comprising a base member positioned exteriorly of said loop at said roll, and a pair of arms extending laterally from said base member at the top of said loop each through the interior of said loop from bottom to top thereof maintaining a portion of the fabric of said loop folded upon itself behind said roll, tensioning said loop against said roll in the tapered form of a four-in-hand tie knot.

15. A pre-tied tie constructed in accordance with claim 14 and in which said roll is secured against loosening by an impalement type fastening member.

16. In a pre-tied tie, the combination of a fabric main tie body, a closed fabric knot-forming loop joined to said body at the top thereof, said loop extending laterally and forwardly of said tie body and being folded at each end upwardly and inwardly behind said body along fold lines extending downwardly and toward the center of the tie, whereby the ends of the loop are disposed laterally of the tie body, and a knot-shaping form including a base portion positioned behind said body on the outside of said loop for engagement with the collar of the wearer and a pair of resilient arms carried by said base portion and extending therefrom laterally of said tie body through the ends of said loop, said arms each having a return bend providing a second set of arms, each extending downwardly and inwardly along one of said fold lines to lie in the trough of the fold and tension the same.

17. A pre-tied tie constructed in accordance with claim 16 and wherein said base portion of said form is a single turn wire torsion spring having its ends extended to form said arms.

18. In a pre-tied tie, the combination of a fabric tie body portion; a closed fabric knot forming loop joining the top of said body portion and extending laterally thereof, said body portion encircling a portion of said loop to provide a roll and depending from said roll through the interior of said loop; a pin type fastener extending through said roll substantially radially of said loop; a spring wire knot shaping element comprising a single turn torsion spring positioned exteriorly of said loop at said roll and having its ends extended laterally of the tie at the top of said loop, said ends each extending through the interior of said loop from bottom to top thereof maintaining a portion of the fabric of said loop in a substantially triangular fold behind said roll to hold said loop in tapered four-in-hand tie knot form, said ends each having a return bend to provide arms each extending downwardly and toward the center of the tie and lying in the trough of the corresponding one of said folds to tension the same, and retaining means secured to said fastener at each side of said roll and extending over the top of said roll and across said torsion spring.

References Cited in the file of this patent

UNITED STATES PATENTS

| | | |
|---|---|---|
| 170,651 | Waehner | Nov. 30, 1875 |
| 569,498 | Jacobowitz | Oct. 13, 1896 |
| 1,143,086 | Soderstrom | June 15, 1915 |
| 1,581,193 | Gilbert | Apr. 20, 1926 |
| 2,122,811 | Fiumendoro | July 5, 1938 |

UNITED STATES PATENT OFFICE

CERTIFICATE OF CORRECTION

Patent No. 2,804,627 September 3, 1957

Joseph W. Less

It is hereby certified that error appears in the printed specification of the above numbered patent requiring correction and that the said Letters Patent should read as corrected below.

Column 3, line 74, for "will b" read --will be--; column 4, line 58, after "tie" insert --body--; column 5, line 23, for "material" read --materially--.

Signed and sealed this 26th day of November 1957.

(SEAL)
Attest:
KARL H. AXLINE
Attesting Officer

ROBERT C. WATSON
Commissioner of Patents